United States Patent [19]

Thompson

[11] 4,455,253

[45] Jun. 19, 1984

[54] PLEOCHROIC ANTHRAQUINONE DYES

[75] Inventor: David J. Thompson, Manchester, England

[73] Assignee: Imperial Chemical Industries PLC, London, England

[21] Appl. No.: 352,058

[22] Filed: Feb. 24, 1982

[30] Foreign Application Priority Data

Feb. 25, 1981 [GB] United Kingdom ................. 8105888
Feb. 25, 1981 [GB] United Kingdom ................. 8105890
Sep. 30, 1981 [GB] United Kingdom ................. 8129518

[51] Int. Cl.$^3$ .......................... C09B 1/58; C02F 1/13; C09K 3/34
[52] U.S. Cl. ................................. 252/299.1; 260/369; 260/378; 260/380; 260/381; 260/383; 260/384; 350/349
[58] Field of Search ..................... 252/299.1; 350/349; 260/380, 381, 378, 383, 384, 369

[56] References Cited

U.S. PATENT DOCUMENTS

| | | | |
|---|---|---|---|
| 3,164,436 | 1/1965 | Altermatt | 260/369 |
| 3,337,553 | 8/1967 | Altermatt | 252/299.1 |
| 3,342,831 | 9/1967 | Braun et al. | 260/369 |
| 3,585,219 | 6/1971 | Braun et al. | 260/369 |
| 4,126,626 | 11/1978 | Jost | 252/299.1 |
| 4,128,396 | 12/1978 | Wick et al. | 252/299.1 |
| 4,136,100 | 1/1979 | Epple | 252/299.1 |
| 4,176,113 | 11/1979 | Wick et al. | 252/299.1 |
| 4,232,949 | 11/1980 | Huffmam | 252/299.1 |
| 4,232,950 | 11/1980 | Denham | 252/299.1 |
| 4,394,070 | 7/1983 | Brown et al. | 252/299.1 |
| 4,405,211 | 9/1983 | Harrison et al. | 252/299.1 |

FOREIGN PATENT DOCUMENTS

| | | | |
|---|---|---|---|
| 2104 | 5/1979 | European Pat. Off. | 252/299.1 |
| 44893 | 2/1982 | European Pat. Off. | |
| 74523 | 3/1983 | European Pat. Off. | 252/299.1 |
| 2009469 | 9/1971 | Fed. Rep. of Germany | 252/299.1 |
| 2920730 | 11/1979 | Fed. Rep. of Germany | 252/299.1 |
| 3150822 | 3/1983 | Fed. Rep. of Germany | 252/299.1 |
| 4892667 | 12/1973 | Japan | 252/299.1 |
| 5790080 | 6/1982 | Japan | 252/299.1 |
| 5792080 | 6/1982 | Japan | 252/299.1 |
| 933520 | 8/1963 | United Kingdom | 260/380 |
| 956014 | 4/1964 | United Kingdom | 260/369 |
| 965006 | 7/1964 | United Kingdom | 260/378 |
| 1078092 | 8/1967 | United Kingdom | 260/369 |
| 1081890 | 9/1967 | United Kingdom | 252/299.1 |
| 1105568 | 2/1968 | United Kingdom | 260/378 |
| 2093475 | 9/1972 | United Kingdom | 252/299.1 |
| 1402704 | 8/1975 | United Kingdom | 252/299.1 |
| 1437444 | 5/1976 | United Kingdom | 260/369 |
| 2033929 | 5/1980 | United Kingdom | 260/378 |
| 2082196 | 3/1982 | United Kingdom | 252/299.1 |
| 2081736 | 2/1982 | United Kingdom | 252/299.1 |
| 2082196 | 3/1982 | United Kingdom | 252/299.1 |

OTHER PUBLICATIONS

Reid, E. E. et al., JACS, vol. 43, pp. 2104–2119 (1921).
Hoffman, W. S. et al., JACS, vol. 45, pp. 1831–1838 (1923).
JACS, vol. 43, (1921) p. 2104.
JACS, vol. 45, (1923) p. 1831.

*Primary Examiner*—Teddy S. Gron
*Attorney, Agent, or Firm*—Cushman, Darby & Cushman

[57] ABSTRACT

An anthraquinone dye free from water-solubilizing and ionic substituents of the general formula:

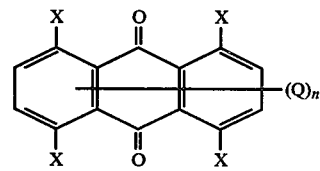

wherein
Q is $NH_2$, OH, alkyl, aryl, $NO_2$ or halo;
n is 0 to 4;
each X independently is H, —SR, —$NZ_1Z_2$ or Q;
each R independently is alkyl, aryl or cycloalkyl;
$Z_1$ and $Z_2$ are independently H, alkyl, cycloalkyl or aryl;

provided that there are at least two different —SR groups and that where only two X's represent —SR groups at least one R is aryl and the two —SR groups are in the 1 & 5 or the 1 & 8 positions.

In addition to the normal textile applications the dye is suitable for use in the coloration of liquid crystals for electro-optic displays.

16 Claims, No Drawings

PLEOCHROIC ANTHRAQUINONE DYES

The invention relates to anthraquinone dyes and their preparation.

According to the present invention there is provided an anthraquinone dye free from water-solubilising and ionic substituents of the general formula:

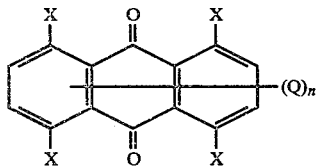

wherein
Q is $NH_2$, OH, alkyl, aryl, $NO_2$ or halo;
n is 0 to 4;
each X independently is H, —SR, —$NZ_1Z_2$ or Q;
each R independently is alkyl, aryl or cycloalkyl; and
$Z_1$ & $Z_2$ are independently H, alkyl, cycloalkyl or aryl; provided that there are at least two different —SR groups and, where only two X's represent —SR groups, at least one R is aryl and the two —SR groups are in the 1 & 5 or the 1 & 8 positions.

The anthraquinone dye of Formula I is useful, in the form of a dispersion, for the colouration of synthetic fibre textile materials.

In addition to this more conventional dyestuff application, the anthraquinone dye of the present invention exhibits pleochroism and is particularly suitable for use in certain electro-optic displays containing liquid crystal materials.

Electro-optic display devices of certain known types depend upon liquid crystal properties displayed by certain compounds known as liquid crystal compounds or materials which display phases intermediate between the fully ordered crystalline state and the fully disorded liquid state, apart from certain temporary short range ordering that is present in most liquid phases.

Broadly speaking there are two principal types of liquid crystal phase, the smectic mesophase in which the molecular ordering is of a substantially lamellar type and the nematic mesophase in which the ordering is substantially linear. Included, sometimes as a sub-claim of the nematic mesophase and sometimes classified as a separate mesophase, is the cholesteric mesophase. This last type has a helical order arising from the presence of a chiral or optically active centre in the molecular compositon of the material and this helical order is superimposed upon the linear order of the nematic mesophase.

Liquid crystal materials have the property of imposing their own ordering upon other molecules incorporated in the materials and having an appropriate molecular configuration or shape. This property is the basis of guest-host devices in which a "host" liquid crystal material has its orientation controlled by the application of electrical or magnetic fields and in turn imposes its order upon "guest" molecules of, for example, pleochroic dyes. These are dyes whose absorption properties vary with the orientation direction of the electric vector of light incident upon them relative to their own molecular alignment. A suitable pleochroic dye usually has an elongated rod-like molecule which absorbs relatiely little light passing along its longitudinal axis but has a maximum absorption of light having its electric vector oriented along the longitudinal axis of the molecule.

Such dye molecules when placed in a liquid crystal material can adopt an orientation which follows the molecular orientation given to the crystal material and, taking advantage of this, two broad classes of guest-host devices are possible based respectively upon a nematic (or Freedericksz effect) device and secondly upon a cholesteric to nematic phase-change device.

In a nematic device the liquid crystal material is originally oriented by known treatment of the inner surfaces of the container, e.g. glass plates bearing device electrodes, containing the liquid crystal material. This orientation is changed by application of an electric field between the device electrodes. The guest dye material also changes its orientation resulting in a change in absorption of light passing along the axis of the electrical field giving a switchable electro-optical display.

In a cholesteric-to-nematic phase change device the host liquid crystal material has positive dielectric anisotropy and is, or includes, an optically active compound which causes the material to exhibit a cholesteric mesophase having a long-pitch helical ordering of short range (the "focal conic" state). In the "off" state the device scatters incident light because the ordering is only short range. However, when the device is switched on, the electrical field applied across the material imposes a linear nematic order parallel to the electric field which results in orientation of any guest dye molecules also parallel to the electrical field and provides minimum absorption in that direction. Thus in the "on" state the device is less scattering and a switchable display is obtained between the "on" and "off" states. The dye enhances the contrast between the two states.

In order to provide maximum contrast between the two states it is important that the guest molecules adopt as closely as possible the time averaged orientation of the host, however this is achieved only to a limited degree because of random thermal fluctuations. The degree to which the orientation varies from the ideal is measured by a quantity known as the order parametr S which is given by the following equation:

$$S = \tfrac{1}{2}(3 \cos^2\theta - 1)$$

where $\cos^2\theta$ is a time averaged term and $\theta$ is the instantaneous angular orientation of the molecules with respect to the time averaged orientation of the host molecules. The determination of the value of the order parameter S is well understood in the art, see for example the paper, "A new absorptive mode reflective liquid crystal display device", by D. L. White and G. N. Taylor in the Journal of Applied Physics, 1974, 45, pages 4718 to 4723.

For perfect orientation the order parameter S is one (that is $\theta$ is zero) and pleochroic dyes for use in guest-host devices should have an order parameter in the liquid crystal host as near one as possible but they must also have adequate chemical, photochemical and electrochemical stability, e.g. stability when exposed to atmospheric contaminants, to electric fields (as in device operation) and to ultra-violet radiation. They should not be ionic or have any ionisable character and should also have sufficient solubility in the host materials although the concentrations of guest pleochroic dye required for the desired effect are generally quite small (ca 10% wt. or below).

Preferred compounds within the scope of Formula I are those of the following formulae:

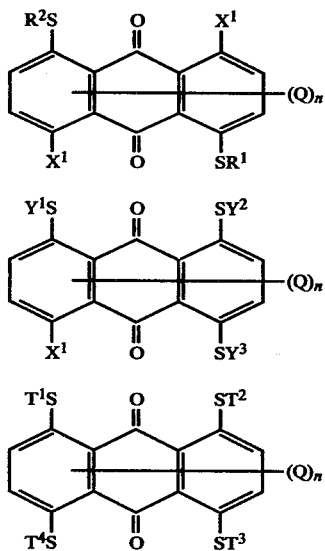

wherein $R^1$ is aryl, $R^2$, $Y^1$ to $Y^3$ and $T^1$ to $T^4$ are each independently alkyl, aryl or cycloalkyl and each $X^1$ is independently H or $-NZ_1Z_2$ and Q, $Z_1$ and $Z_2$ are as hereinbefore defined, provided that all of the radicals represented by $R^1$ and $R^2$, or by $Y^1$ to $Y^3$ or by $T^1$ to $T^4$ are not identical.

The alkyl group represented by R, $R^2$, $Z_1$, $Z_2$, any one of $Y^1$ to $Y^3$ or any one of $T^1$ to $T^4$, which may be branched or staight chain, desirably contains up to 20 carbon atoms but is preferably a lower alkyl group and more preferably contains from 1 to 4 carbon atoms. The cycloalkyl group represented by the same symbols preferably contains from 4 to 8 carbon atoms and is more preferably a cyclohexyl group. The aryl group represented by R, $R^1$, $R^2$, $Z_1$, $Z_2$, any one of $Y^1$ to $Y^3$ or any one of $T^1$ to $T^4$ prferably contains up to 15 carbon atoms and is more preferably a mono- or bi-carbocyclic aryl group such as phenyl or naphthyl.

The alkyl group represented by Q, which may be branched or straight chain, preferably contains from 1 to 20 carbon atoms and is more preferably lower alkyl. The aryl group represented by Q preferably contains up to 15 carbon atoms and is more preferably monocarbocyclic aryl, such as phenyl.

The alkyl, aryl and cycloalkyl radicals represented by R, $R^1$, $R^2$, $Z_1$, $Z_2$, $Y^1$ to $Y^3$, $T^1$ to $T^4$, and Q may be substituted by non-ionic groups. Phenyl groups are preferably substituted in the para (4-) position with respect to the linkage to the N or S atom or to the anthraquinone nucleus although, in the case of methylphenylthio substituents, a product containing a 3-methylphenylthio group is usually more soluble than the same product containing a 4-methylphenylthio group. Preferred substituent groups for the alkyl radicals are lower alkoxy, preferably $C_1$ to $C_4$ alkoxy, halogeno, preferably chloro, or aryl, containing up to 15 carbon atoms, preferably mono-cyclic aryl, such as phenyl. Preferred substituent groups for the aryl radicals, e.g. those represented by $R^3$, $R^4$ and $T^5$ or $T^{10}$ below, and cycloalkyl radicals are alkyl and alkoxy, containing up to 20 carbon atoms, preferably lower alkyl and lower alkoxy and more preferably $C_1$ to $C_4$ alkyl and alkoxy, halogeno, preferably chloro, $C_4$ to $C_8$ cycloalkyl, preferably cyclohexyl, and aryl, containing up to 15 carbon atoms, preferably monocyclic aryl, such as phenyl.

Throughout this specification the expressions "lower alkyl" and "lower alkoxy" mean alkyl and alkoxy radicals containing from 1 to 10 carbon atoms.

A preferred class of yellow to red dyes of Formula I are those in which n is 0 and two, three or four of the groups represented by X are —SR groups, the remainder being $-NZ_1Z_2$ or, more preferably H. A preferred class of red to blue dyes according to Formula I are those in which 2 X's are —SR groups and 2 X's are groups represented by Q, especially OH or $NH_2$ groups. It is further preferred in this latter class of dyes that n is 1 or 2 and that each Q represents an alkyl radical containing up to 20 carbon atoms in positions adjacent to the OH or $NH_2$ groups.

It is generally preferred that at least one and more preferably all of the —SR groups are arylthio groups, and more preferably are phenylthio groups. The difference between the two aryl groups may occur in the aromatic nucleus but preferably occurs in the nature and/or position of a substituent on the aromatic nucleus. Where there are only two —SR groups they are preferably in the 1 and 5 positions. Another preferred group of dyes contains at least one arylthio group and at least one cycloalkylthio group.

The unsymmetrical di-, tri- and tetra(substituted thio)anthraquinones are generally more soluble in liquid crystal materials than the equivalent symmetrical di-, tri- and tetra(substituted thio)anthraquinones such as are disclosed in United Kingdom Patent Specification No 2043097A and United Kingdom Patent Specification No 2082196A. In this specification the term "unsymmetrical" used in relation to poly(substituted thio)anthraquinones indicates that there are at least two different substituted thio groups in the molecule whereas the term "symmetrical" in the same context indicates that all the substituted thio groups in the molecule are identical. The present invention does however include compositions comprising a mixture of symmetrical and unsymmetrical poly(substituted thio)anthraquinones, as well as the pure unsymmetrical compounds themselves and mixtures thereof. It is however preferred that the compositions comprise at least 50% by weight of the unsymmetrical poly(substituted thio)anthraquinones and more preferably at least 75% by weight of these unsymmetrical compounds. The unsymmetrical compounds can be obtained in a pure form, i.e. free from the closely related symmetrical compounds by chromatographic separation procedures, especially by preparative or high pressure liquid chromatography. The main advantage of the pure unsymmetrical compounds over compositions containing mixtures of these with the symmetrical compounds is the generally greater solubility of the former which is of importance in the contrast and stability, over a wide temperature range, of the liquid crystal display.

Solubility is, however, only one of the factors affecting the achievement of good contrast in a liquid crystal display, another factor is the extinction coefficient of the dye in the liquid crystal material. One useful indication of the ability of a dye to give good contrast is the product of the molar extinction coefficient and the solubility (in moles/liter). For good commercial performance it is desirable that solutions of dyes in liquid crystal compositions for use in electronic displays should have a value for this product which is at least 500 cm$^{-1}$ and preferably at least 750 cm$^{-1}$. As the molar extinction coefficient for a dye does not vary significantly from one liquid crystal material to another, these values for the above defined product are a direct indication of the desired and preferred minimum solubilities of a particular dye in any liquid crystal material. Thus for a dye having a molar extinction coefficient of 11,000 cm$^2$.moles$^{-1}$ the solubility should preferably be at least $4.5 \times 10^{-2}$ moles/liter and more preferably at least $6.8 \times 10^{-2}$ moles/liter. In fact the yellow dye of Example 1 has this value for the extinction coefficient and a molecular weight of 480 so that the solubility (wt %) for this dye should preferably be at least 2.2% and more preferably be at least 3.3%; the actual solubility of this dye in the liquid crystal material E43 (see Example 1) is 8.6%. For a dye having a molar extinction coefficient of 16,000 cm$^2$.moles$^{-1}$ the solubility should preferably be at least $3.1 \times 10^{-2}$ moles/liter and more preferably at least $4.6 \times 10^{-2}$ moles/liter. In fact the red dye of Example 1 has this value for the extinction coefficient and a molecular weight of 650 so that the solubility of this dye (wt %) would preferably be at least 2% and more preferably at least 3%; the actual solubility of this dye in the liquid crystal material E43 is almost 15%. For a dye having a molar extinction coefficient of 20,000 cm$^2$.moles$^{-1}$ the solubility is preferably be at least $2.5 \times 10^{-2}$ moles/liter and more preferably at least $3.8 \times 10^{-2}$ moles/liter. In fact the violet dye of Example 21 has this value for the extinction coefficient and a molecular weight of 590 so that the solubility should preferably be at least 1.5% and more preferably at least 2.2%; the actual solubility of this dye in the liquid crystal material E43 is 4.6%.

Dyes prepared for use in liquid crystal displays should preferably be as pure as possible in terms of their freedom from inorganic and other ionisable materials which can interfere with the operation of the display or from materials which are radiation sensitive and decompose within the display during operation. The dyes should also preferably be free from non- or inferior pleochroic materials, such as starting materials, intermediates and by-products, which do not contribute to the perceived contrast of the display or which are less soluble in the liquid crystal material. To obtain the dyes in a pure form, i.e. substantially free from interfering or deleterious matter, it is generally desirable to submit them to repeated recrystallisations from organics solvents such as chloroform and/or chromatographic separation procedures.

The anthraquinone dyes of the present invention have very high stability in liquid crystal media and high order parameters, generally greater than 0.7, in both positive and negative anisotropic liquid crystal materials. The di(substituted thio)anthraquinones are of particular value because stable yellow dyes with high order parameters and good solubility have not heretofore been obtained.

As the addition of any dye to a liquid crystal material raises the viscosity of the latter and thus tends to increase the response time of a display in which it is incorporated, it is desirable to use as little dye as possible. In this respect the present dyes are of particular value because many of them have high extinction coefficients and thus only small quantities, generally less than about 10%, are required in the liquid crystal material.

The anthraquinone dyes of the present invention may be mixed with other pleochroic dyes to produce intermediate shades and neutral shades, such as greys and blacks, the latter being especially suitable for use in black-on-white electronic displays.

A preferred class of yellow dyes, containing two different —SR groups, has the general formula:

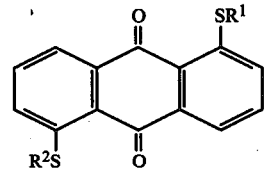

V wherein $R^1$ is aryl containing up to 15 carbon atoms and $R^2$ is any of the groups represented by R above provided that $R^1$ and $R^2$ are not identical.

Radicals which may be represented by $R^2$ include $C_1$ to $C_{20}$ alkyl, up to $C_{15}$ aryl and $C_4$ to $C_8$ cycloalkyl which may carry one or more non-ionic substituents such as those mentioned above. When $R^2$ is an aryl radical, it must be different from the aryl radical represented by $R^1$. This difference may occur in the aromatic nucleus or in the nature and/or position of a substituent thereon. Useful compounds of this type include those of the formula:

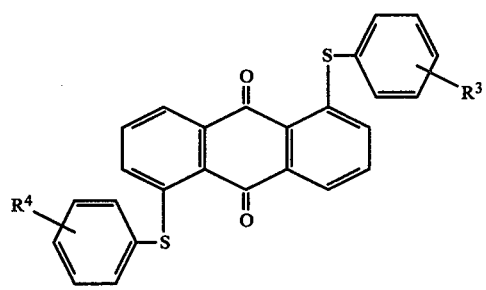

VI wherein $R^3$ represents hydrogen or a non-ionic substituent, $R^4$ represents a non-ionic substituent and $R^3$ differs from $R^4$ in constitution and/or in its position on the phenyl radical.

Particular mention may be made of compounds of the formula:

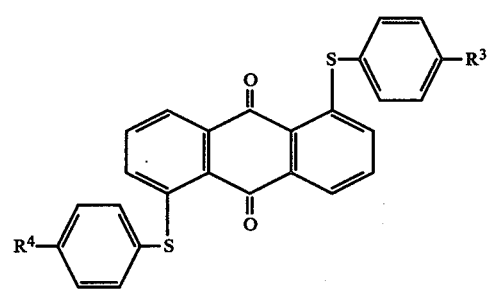

VII wherein $R^3$ and $R^4$ have the meanings given above and $R^3$ differs in constitution from $R^4$. Especially useful compounds of this type include those in which $R^3$ is H and $R^4$ is lower alkyl, especially t-butyl, or phenyl.

Other especially preferred compounds according to Formula V are those in which $R^2$ is cyclohexyl, and particularly where $R^1$ is phenyl or 4-t-butylphenyl.

Dyes of Formula V may be prepared by reacting one equivalent of the thiol, $R^1SH$, and one equivalent of the thiol, $R^2SH$, with one equivalent of a 1,5-dihalogenoanthraquinone. The reaction is conveniently carried out in a solvent, for example dimethylformamide, and in the presence of an acid-binding agent, for example potassium carbonate.

The product of this reaction is a statistical mixture containing the compound of Formula V as major component together with the symmetrical compounds of the formulae:

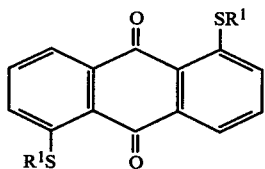
VIII and

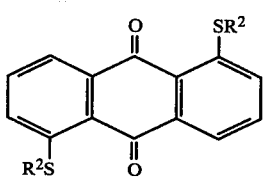
IX

Compounds of Formula V may be prepared in a purer form by reacting a 1-halogeno-5-nitroanthraquinone with one equivalent of the first thiol ($R^1SH$) under mild conditions and then reacting the product with one equivalent of the second thiol ($R^2SH$) at a higher temperature.

In UK Patent Application GB 2043097A, liquid crystal compositions are disclosed which can contain symmetrical dyes of the formula:

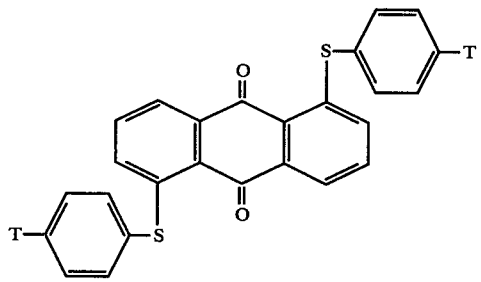
X wherein T is hydrogen or a non-ionic substituent. Dyes of this class, such as 1,5-bis(phenylthio)anthraquinone, have high order parameters and adequate stability but, in general, their solubility in the liquid crystal materials is insufficient for practical purposes giving somewhat weak colour effects. Mixtures of two or more compounds of Formula X also have low solubilities in the liquid crystal materials.

It is surprising that the unsymmetrical dyes of Formula V have significantly higher solubilities in liquid crystal materials than the symmetrical dyes of Formulae VIII, IX and X. Although the pure unsymmetrical dyes also have higher solubilities than those mixtures mentioned above which contain the symmetrical compounds of Formulae VIII and IX as impurities, the mixtures of unsymmetrical and symmetrical dyes have sufficiently higher solubilities than the pure symmetrical dyes to give them commercial utility.

A preferred class of red dyes, containing four —Sr groups, not more than three of which are identical, has the general formula:

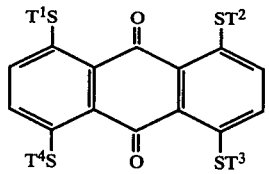
XI wherein each of $T^1$, $T^2$, $T^3$ and $T^4$ may be any of the groups represented by R above, provided not more than three are identical. Preferred values for $T^1$ to $T^4$ are phenyl substituted phenyl and cyclohexyl.

Particularly useful compounds of Formula XI are those in which each of $T^1$, $T^2$, $T^3$ and $T^4$ is an aryl radical of which not more than three are identical. Differences between these radicals may occur in the aromatic nucleus or in the nature and/or position of the substituents thereon. Useful compounds of this type include those of the formula:

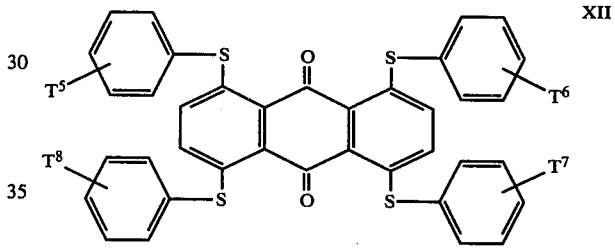
XII wherein each of $T^5$, $T^6$, $T^7$ and $T^8$ independently represents hydrogen or a non-ionic substituent, as hereinbefore described, at least one of $T^5$, $T^6$, $T^7$ and $T^8$ being different from the other in either constitution or position.

Particular mention may be made of compounds of the formula:

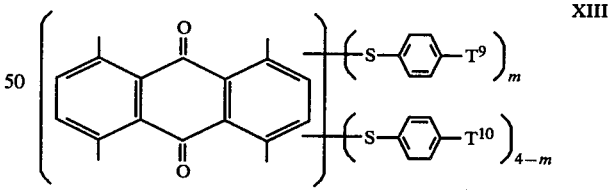
XIII wherein $T^9$ represents hydrogen or a non-ionic substituent, $T^{10}$ represents a non-ionic substituent, $T^9$ and $T^{10}$ not being identical, and m is from 1 to 3. Preferred compounds of this type include those in which $T^9$ is H, $T^{10}$ is phenyl, cyclohexyl or lower alkyl, especially t-butyl, and m is 1.

Dyes of Formula XI may be prepared by reacting a 1,4,5,8-tetrahalogenoanthraquinone with one equivalent of each of the thiols: $T^1SH$, $T^2SH$, $T^3SH$, $T^4SH$, not more than three of $T^1$, $T^2$, $T^3$ and $T^4$ being identical. The reaction is conveniently carried out in a solvent, for example dimethylformamide, and in the presence of an acid-binding agent, for example potassium carbonate.

Thus, compounds of Formula XIII may be prepared by reacting the tetrahalogenoanthraquinone with m equivalents of a thiol of formula:

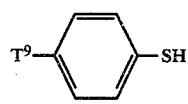

and 4-m equivalents of a thiol of formula:

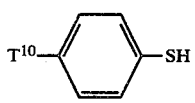

The product of these reactions is a statistical mixture in which compounds of Formula XI predominate together with lesser amounts of compounds in which $T^1$, $T^2$, $T^3$ and $T^4$ are identical.

In U.K. patent application No. 8024797, liquid crystal compositions have been proposed which contain symmetrical dyes of the formula:

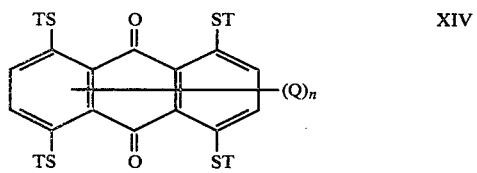 XIV wherein T represents an optionally substituted alkyl or aryl radical, Q represents halogen, hydroxy, amino, alkylamino, dialkylamino, arylamino, nitro, alkyl or aryl and y represents an integer of 0 to 4. Particular mention is made of 1,4,5,8-tetrakis(phenylthio)anthraquinone. These symmetrical tetra(substituted thio)anthraquinones have high order parameters and adequate stability but their solubility in liquid crystal materials is generally lower than is desirable for practical purposes.

It is surprising that the unsymmetrical dyes of Formula XI have significantly higher solubilities in liquid crystal materials than the symmetrical dyes of Formula XIV.

The preferred group of orange dyes of Formula III may be prepared by reacting two different substituted thiols with a trichloroanthraquinone, in the presence of an acid binding agent, to give a composition containing mainly the unsymmetrical compounds together with a smaller proportion of the symmetrical compounds. Alternatively one thiol may be reacted with a nitrodichloroathraquinone under mild conditions to give a thiodichloroanthraquinone and the second thiol reacted with the thiodichloroanthraquinone intermediate to give a single unsymmetrical tri(substituted thio)anthraquinone with only minor quantities of the symmetrical products.

The $-NZ_1Z_2$ groups and the groups represented by Q are preferably introduced prior to the $-SR$ groups by known methods for introducing such groups, e.g. by reacting an amino compound $HNZ_1Z_2$ with the appropriate chloranthraquinone.

Examples of other suitable compounds of Formula I are: 1-phenylthio-5-(naphth-2-ylthio)anthraquinone, 1-phenylthio-5-(dodecylthio)anthraquinone, 1-phenylthio-5-(4-nonylphenylthio)anthraquinone, 1-(phenylthio)-4,5,8-tri(cyclohexylthio)anthraquinone 1-(phenylthio)-4,5,8-tri(4-phenylphenylthio)anthraquinone, 1-(phenylthio)-4,5,8-tri(4-t-butylphenylthio)anthraquinone, 1-phenylthio-4-anilino-5-(4-methylphenylthio)anthraquinone, 1-phenylthio-4,8-di(butylamino)-5-butylthio-anthraquinone, and 1-phenylthio-5-cyclopentylthio)anthraquinone.

The invention is further illustrated by the following Examples in which all parts and percentages are by weight unless otherwise indicated and the letters "AQ" are used to represent anthraquinone.

EXAMPLE 1

1,4,5,8-tetrachloroanthraquinone (12 g) was added to a stirred mixture of dimethylformamide (100 ml), potassium carbonate (12 g), thiophenol (10.4 ml) and 4-t-butylphenylthiol (14.8 ml). The reaction mixture was heated to 130°–140° C. and maintained at that temperature for 5 hours. After cooling overnight, the reaction product was filtered and the filter cake was washed several times with a 50:50 mixture of ethanol and 2N sodium hydroxide solution. The washed product was then washed with very dilute acetic acid, washed acid free with water, dried at 50° C. in vacuo, dissolved in the minimum amount of boiling toluene, filtered, reprecipitated by the addition of methanol, filtered of, washed with methanol and dried at 50° C.

The product contained the following substituted anthraquinones (AQ):

TABLE 1

| Component | Wt. % |
|---|---|
| tetrakis-(phenylthio)AQ | 1% |
| tris-(phenylthio)-t-butylphenylthio-AQ | 19% |
| bis-(phenylthio)-bis-(t-butylphenylthio)AQ | 65% |
| tris-(t-butylphenylthio)-phenylthio-AQ | 11% |
| tetrakis-(t-butylphenylthio)AQ | 4% |

The solubility of the product was measured in liquid crystal material E43 marketed by BDH Chemicals Limited of Broom Road, Poole, Dorset, England. E43 contains the compounds:

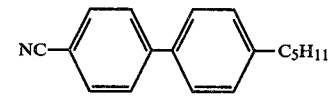

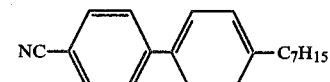

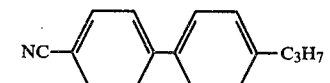

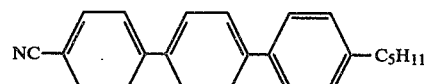

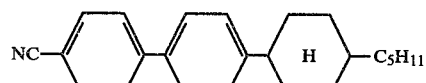

The solubility of the product in E43 at 20° C. is 14.7%. For comparison, the solubilities of pure 1,4,5,8-tetrakis(phenylthio)anthraquinone and pure 1,4,5,8-tetrakis(4-t-butylphenylthio)anthraquinone in the same material are, respectively, <1% to 1.8%.

EXAMPLE 2

The procedure of Example 1 was repeated except that the 4-t-butylphenylthiol was replaced by the equivalent quantity of 4-methylphenylthiol.

EXAMPLE 3

Thiophenol (2.97 g), 4-phenylphenylthiol (4.38 g) and potassium carbonate (3.73 g) were stirred in 23 ml dimethylformamide(DMF) at 120° C. for 1 hour and cooled to ambient temperature. 1,4,5,8-Tetrachloroanthraquinone (3.46 g) was added, the mixture held at 120° C. for 4 hours and then cooled to ambient. After the addition of 20 ml ethanol the mixture was worked up by the following procedure. After filtration and washing with a 50:50 mixture of 2N NaOH and ethanol and crude product was slurried in 30 ml of the same solvent mixture, stirred for 30 minutes, filtered, washed successively with the caustic soda/ethanol solvent and water and dried at 80° C.

The work-up product was boiled in 30 ml chloroform, filtered cold and the filtrate added dropwise to 250 ml petroleum ether (100–120). After stirring for 1 hour the precipitate was filtered, washed with 40–60 petroleum ether and dried at 80° C. The product contained about 90% unsymmetrical tetra(substitutedthio)anthraquinones, carrying both phenylthio and 4-phenylphenylthio groups, the remainder being symmetrical tetra(substitutedthio)anthraquinones, carrying either phenylthio or 4-phenylphenylthio groups.

EXAMPLE 4

1.98 G thiophenol, 2.07 g of cyclohexylthiol and 2.02 g of KOH in 30 ml ethanol were stirred at reflux for 1 hour and cooled to ambient temperature. 1,4,5,8,-Tetrachloro-AQ (2.31 g) was added and the mixture stirred at reflux temperature for 16 hours before cooling to room temperature and working up according to the work-up procedure of Example 3. The crude solid was dissolved in 100 ml hot chloroform, screened and drowned into 300 ml methanol over a 5 minute period. The drownout mass was stirred for 30 minutes and the solid filtered, washed with methanol and dried at 80° C. (yield 2.8 g). The main constituents of the product are unsymmetrical tetra(substituted thio)AQs, carrying cyclohexylthio and phenylthio groups in the 1,4,5 and 8 positions.

EXAMPLE 5

The procedure of Example 4 was repeated except for the replacement of the cyclohexylthiol by the equivalent weight of 4-methoxyphenylthiol. The main constituents of the product are unsymmetrical tetra(substituted thio)AQs carrying phenylthio and 4methoxyphenylthio groups in the 1,4,5 and 8 positions.

EXAMPLE 6

1,5-Dichloroanthraquinone (12 g) was added to a stirred mixture of dimethylformamide (100 ml), potassium carbonate (8.0 g), thiophenol (thiol 1: 7.0 ml) and 4-t-butylphenylthiol (thiol 2: 8.0 ml). The reaction mixture was heated to 130°–140° C. and maintained at that temperature for 5 hours. After cooling overnight, the reaction product was filtered and the filter cake was washed several times with a 50:50 mixture of ethanol and 2N sodium hydroxide solution. The washed product was then washed with very dilute acetic acid, washed acid-free with water, dried at 50° C. in vacuo, dissolved in the minimum amount of boiling toluene, filtered, re-precipitated by the addition of methanol, filtered off, washed with methanol and dried at 50° C.

The product contained 55% of 1-(4-t-butylphenylthio)-5-phenylthioanthraquinone, the remainder being the two symmetrical 1,5-disubstituted anthraquinones.

The following 4 analogous products were prepared by the method of Example 6 using the equivalent quantities of the appropriately substituted thiols in place of the thiophenol and the 4-t-butylphenylthiol used in Example 6

EXAMPLE 7

Thiol 1: thiophenol
Thiol 2: 3-methylphenylthiol
Main product: 1-phenylthio-5(3-methylphenylthio)AQ
% in compn: 48%

EXAMPLE 8

Thiol 1: 3-methylphenylthiol
Thiol 2: 4-t-butylphenylthiol
Main product: 1(3-methylphenylthio)-5(4-t-butylphenylthio)AQ
% in compn: 64%

EXAMPLE 9

Thiol 1: 3-methylphenylthiol
Thiol 2: 4-methylphenylthiol
Main product: 1(3-methylphenylthio)-5(4-methylphenylthio)AQ

EXAMPLE 10

Thiol 1: thiophenol
Thiol 2: 4-methylphenylthiol
Main product: 1-phenylthio-5(4-methylphenylthio)AQ

EXAMPLE 11

A mixture of 73.7 g 4-t-butylphenylthiol (thiol 2) 25 g potassium hydroxide, and 640 ml ethanol was heated at reflux temperature for 1 hour and cooled to room temperature. To this mixture was added 86.5 g 1-phenylthio-5-chloroanthraquinone, over a period of 5 minutes, the mixture heated to reflux and held there for 16 hours. At the end of the reaction period the mixture was cooled to room temperature, the solid product filtered off and washed with 200 ml 50% 2N NaOH/ethanol. The crude product was reslurried into a further 200 ml of the same mixed solvent, stirred for 30 minutes, refiltered, washed successively with 100 ml 50% 2N NaOH/ethanol and 100 ml water and dried at 80° C.

The product was extracted with 2 liters 15:1 mixture of 100–120 petroleum ether and chloroform at reflux for 48 hours following which the chloroform was distilled off. The slurry in petroleum ether was cooled and filtered after 24 hours at room temperature, washed with 100 ml 40–60 petroleum ether and dried at 80° C.

After repeated recrystallisation from methanol the product, containing about 88% 1-phenylthio-5-(4-t-butylphenylthio)anthraquinone, had a melting point of 241° C.

The 1-phenylthio-5-chloroanthraquinone used above was prepared by adding 72.5 g 1-nitro-5-chloroanthraquinone and 500 ml ethanol to a mixture of 78 g of thiophenol (thiol 1), 32 g potassium carbonate and 125 ml dimethylformamide (previously refluxed at 120° C. for 2 hours and cooled to room temperature) and heating to 40° C. for 16 hours. After cooling and standing for 48 hours the solid product was filtered, washed with 1 liter 40% aqueous ethanol, reslurried in 500 ml of the same solvent, stirred for 30 minutes, filtered and washed successively with 200 ml 40% aqueous ethanol and 1 liter water. The product was reslurried in 500 ml water for 30 minutes, filtered, washed with water and finally with 100 ml ethanol and dried at 80° C.

Table 2 compares the solubilities of the dyes of Examples 6 and 11, with those of the equivalent symmetrical dyes, in the liquid crystal material E43 (see Example 1) at 20° C.

TABLE 2

| No. | Dye | Solubility (wt. %) |
|---|---|---|
| 1 | 1,5-bis(phenylthio)anthraquinone | 1.7 |
| 2 | 1,5-bis(4-t-butylphenylthio)anthraquinone | 2.0 |
| 3 | Physical 50/50 mixture of 1 and 2 above | <2.0 |
| 4 | 1-phenylthio-5-(4-t-butylphenylthio) anthraquinone (product of Example 11) | 8.6 |
| 5 | Chemical mixture of 1, 2 and 4 above (product of Example 6) | 3.2 |

It is clear from the solubility data listed in Table 2 that the unsymmetrical product, either alone or in admixture with the symmetrical equivalents, has a considerably higher solubility in the liquid crystal medium than either of the symmetrical products or their mixture. This higher solubility is not only completely unexpected but of considerable commercial significance in view of the demand for liquid crystal displays which are stable over a wide temperature range from below 0° C. to around 100° C.

The following six analogous compositions were prepared according to the process of Example 11 using the equivalent quantities of the appropriately substituted thiols in place of the thiols used in Example 11.

EXAMPLE 12

Thiol 1: thiophenol
Thiol 2: 3-methylphenylthiol
Main product: 1-phenylthio-5(3-methylphenylthio)AQ
% in compn.: 81%
M.P.: 227° C.

EXAMPLE 13

Thiol 1: thiophenol
Thiol 2: 4-methylphenylthiol
Main product: 1-phenylthio-5(4-methylphenylthio)AQ
% in compn.: 83%
M.P.: 269° C.

EXAMPLE 14

Thiol 1: thiophenol
Thiol 2: n-butylthiol
Main product: 1-phenylthio-5(n-butylthio)AQ
% of compn.: 98%
M.P.: 163° C.

EXAMPLE 15

Thiol 1: thiophenol
Thiol 2: 4-phenylphenylthiol
Main product: 1-phenylthio-5(4-phenylphenylthio)AQ
% in compn.: 91%

EXAMPLE 16

Thiol 1: thiophenol
Thiol 2: cyclohexylthiol
Main product: 1-phenylthio-5-cyclohexylthio-AQ

EXAMPLE 17

Thiol 1: thiophenol
Thiol 2: 4-methoxyphenylthiol
Main Product: 1-phenylthio-5-(4-methoxyphenylthio)AQ

EXAMPLE 18

A solution of 1.98 g of thiophenol, 2.99 g of 4-t-butylphenylthiol and 2.48 g of potassium carbonate in 20 ml of DMF was heated to 115° C. and stirred at this temperature for 1 hour. To the solution was added 3.28 g of 1,5-dinitro-4,8-diamino-AQ and the mixture stirred for 8 hours at 115° C. It was then cooled to room temperature, filtered, washed successively with DMF, water and ethanol and dried to give 1.7 g of crude product.

The crude product was purified by screening in hot chloroform and, after cooling, passage through a silica-packed chromatography column. The column was eluted with chloroform and the main blue band was collected and evaporated to dryness. The dry material was slurry washed with 20 ml methanol, filtered, washed with methanol and dried at 80° C. to give 0.2 g of purified composition containing 63% 1-phenylthio-5(4-t-butylphenylthio)-4,8-diamino-AQ.

The 1,5-dintro-4,8-diamino-AQ was prepared from 1,5-diamino-AQ-bis-N,N-dimethylformidinium chloride by the method of Example 2 of U.K. Patent Specification No. 1041528 and the 1,5-diamino-AQ-bis-N,N-dimethylformidinium chloride was made from 1,5-diamino-AQ by the method of Example 2 of German Patent Specification No. 1132931.

EXAMPLE 19

Thiophenol (1.98 g), 3-methylphenylthiol (2.33 g) and potassium carbonate (2.02 g) were stirred at 115° C. in 15 ml DMF for 1 hour and cooled to room temperature. To this mixture were added 4.24 g of 1,5-dibromo-4,8-di(methylamino)AQ over 5 minutes and the mixture reheated to 120° C. and stirred at this temperature for 16 hours. After cooling to ambient temperature and the addition of 25 ml ethanol the crude material was worked up as in Example 3 to yield 4.35 g. The worked up material was dissolved in chloroform and passed through a silica-packed chromatography column eluting with chloroform and collecting the main red band. After evaporation of the chloroform, washing with methanol and drying at 80° C. the yield of purified material was 4.09 g containing 48.9% of 1-phenylthio-5(4-t-butyl phenylthio)-4,8-di(methylamino)AQ, the remainder being the two symmetrical di(substituted thio)AQs.

EXAMPLE 20

A mixture of 1.24 g of thiophenol, 1.87 g of 4-t-butylphenylthiol and 1.56 g of potassium carbonate in 10 ml DMF were stirred at 120° C. for 1 hour and cooled to ambient temperature. To the cooled mixture were added 1.73 g of 1-nitro-5,8-dicloro-4-anilino-AQ and the mixture stirred at 120° C. for 5 hours. After cooling to ambient temperature and adding 27 ml ethanol and 40 ml water the solid was filtered, washed with water and ethanol and dried to yield 3.55 g of crude material.

The crude material was dissolved in chloroform and passed through a silica-packed chromatography column, eluting with chloroform and collecting the main orange band. After evaporating the solvent, 30 ml methanol were added and the solid material filtered, washed with methanol and dried at 50° C. (yield 2.95 g). The purified material contained 65% unsymmetrical tri(substituted thio)AQs, the remainder being mainly the two symmetrical tri(substituted thio)AQs.

The 1-nitro-4-anilino-5,8-dichloro-AQ was prepared according to the following method:

A mixture of 7.83 g of aniline and 10 g of 1,4,5-trichloro-8-nitro anthraquinone in 75 ml 2-ethoxyethanol was heated at 120° C. for 18 hours. The product was filtered, washed with ethanol, slurried in 50 ml ethanol and refiltered. It was then stirred into 50 ml 2N HCl, filtered, washed acid free with water and dried at 80° C. The final stage of purification consited of stirring the dry material in 50 ml chloroform for 20 minutes, filtering, washing with chloroform and drying at 80° C. to yield 5.9 g of product (m.p. 216°-7° C.) having a purity of 90.5%, by chromatography

EXAMPLE 21

A mixture of 1.48 g thiophenol, 2.24 g 4-t-butylphenylthiol and 1.5 g KOH were refluxed in 15 ml ethanol for 1 hour and cooled to ambient temperature. To the cooled mixture were added 1.5 g of 1,4,5-trichloro-AQ and the mixture refluxed for 16 hours. After cooling to ambient temperature the mixture was worked up as described in Example 3. The 2.3 g of worked up material contained 62% unsymmetrical tri(substituted thio)AQs, i.e. di(phenylthio)-(4-t-butylphenylthio)AQ and phenylthio-di(4-t-butylphenylthio)AQ, the remainder being mainly the two symmetrical tri(substituted thio)AQs.

EXAMPLE 22

A mixture of 0.127 g of thiophenol and 0.065 g KOH in 15 ml ethanol was refluxed for 1 hour and cooled to ambient temperature. To the cooled mixture was added 0.66 g of 1,5-di(4-t-butylphenylthio)-4-chloro-AQ and the mixture refluxed for 16 hours before cooling to ambient temperature. After working up as described in Example 3 the yield of dry material was 0.6 g. This material contained 78% of 1,5-di(4-t-butylphenylthio)-4-phenylthio-AQ.

The 1,5-di(4-t-butylphenylthio)-4-chloro-AQ was prepared as follows:

A mixture of 2.98 g of 4-t-butylphenylthiol and 0.51 g KOH in 10 ml ethanol was refluxed for 1 hour and cooled to ambient temperature. To this was added 1.56 g of 1,4,5-trichlor-AQ and the mixture stirred at 40° C. for 16 hours before cooling to ambient temperature. After working up the crude material as described in Example 3 it was further purified by dissolving in 100 ml 60-80 petroleum ether, screening and passage through a silica-packed chromatography column, eluting with the same solvent and collecting the middle orange band. After evaporation of the solvent, washing with methanol and drying the yield of purified material was 0.9 g.

EXAMPLE 23

A mixture of 1.1 ml (0.01 moles) of thiophenol and 5.8 g of 1,5-dihydroxy-2,6-dinonyl-4,8-dinitro-AQ (0.01 moles) in 50 ml pyridine was stirred for 30 minutes at room temperature and then drowned out into 100 ml water. Concentrated HCl (75 ml) was added and the precipitated solid was filtered, washed with water and dried to yield 6 g of crude material. A portion of this (3 g) was recrystallised from 100–120 petroleum ether to yield 1.3 g of the intermediate 1,5-dihydroxy-2,6-dinonyl-4-nitro-8-phenylthioanthraquinone (structure confirmed by mass spectrometry).

A mixture of 0.65 g of the above intermediate and 0.2 g of 4-t-butylphenylthiol in 10 ml pyridine was stirred at 90°-5° C. for 16 hours and then drowned out into 50 ml of dilute HCl. The precipitated solid was filtered, washed successively with water and methanol and dried. It was then recrystallised from 40–60 petroleum ether to yield 0.1 g of product consisting mainly of 1,5-dihydroxy-2,6-dinonyl-4(4-t-butylphenylthio)-8-phenylthio-AQ (structure confirmed by mass spectrometry).

The 1,5-dihydroxy-2,6-dinonyl-4,8-dinitro-AQ was made according to the method described in U.K. Patent Specification No. 2038809A by reacting 1,5-dihydroxy-AQ with nonanal and nitrating the di-nonyl derivative.

EXAMPLE 24

A mixture of 6.6 g of 1,8-dihydroxy-2,7-didodecyl-4,5-dinitro-AQ, 1.1 g of thiophenol and 100 ml pyridine were stirred mixed at ambient temperature for 2 hours and then drowned out into 200 ml water. The precipitated solid was filtered, washed successively with water and methanol and dried to yield 4.5 g of crude material. After recrystallisation from 100–120 petroleum ether the product was 1,8-dihydroxy-2,7-didodecyl-4-phenylthio-5-nitro-AQ (4.15 g: structure confirmed by mass spectrometry).

A portion of this intermediate (3.7 g) was added to a solution of 0.83 g of 4-t-butylphenylthiol and 0.3 g KOH in 50 ml iso-propanol at 65° C. After heating the mixture at the reflux (83° C.) for 3 hours it was cooled to ambient temperature, filtered, washed successively with isopropanol and methanol, dried and recrystallised from 100–120 petroleum ether. The product (2.75 g) was essentially 1,8-dihydroxy-2,7-didodecyl-4-phenylthio-5-(4-t-butylphenylthio)AQ.

The 1,8-dihydroxy-2,7-didodecyl-4,5-dinitro-AQ was made according to the method described in UK Patent Specification No. 2038809A by reacting 1,8-dihydroxy-AQ with dodecanal and nitrating the di-dodecyl derivative.

EXAMPLE 25

A sample of the product prepared according to the process described in Example 1 was passed through a high pressure liquid chromatography column packed with Partisil 5μ (250×4.6 mm) using 99:1 hexane:acetonitrile as eluent at a flow rate of 2 ml/min and ambient temperature (20° C.). Detection was by means of a u.v. source (254 nm) and samples, corresponding to all the peaks in the chromatogram, were collected. The fractions collected are identified in Table 3, together with their properties in the liquid crystal medium, E43, at 20° C.

TABLE 3

| Fraction | Structure | Solubility (%) | Order Parameter | λmax (nm) |
|---|---|---|---|---|
| 1 | Tetrakis-X-AQ | 1.8 | 0.78 | 550 |
| 2 | Tri-X-mono-Y-AQ | 10.7 | 0.78 | 550 |
| 3 | Di-X-di-Y-AQ | <0.5 | — | 550 |
| 3a | Di-X-di-Y-AQ | 1.0 | 0.78 | 550 |
| 4 | Di-X-di-Y-AQ | 2.9 | 0.77 | 550 |
| 5 | Mono-X-tri-Y-AQ | 1.0 | 0.78 | 550 |
| 6 | Tetrakis-Y-AQ | <1.0 | 0.78 | 550 |

In Table 3, X represents 4-t-butylphenylthio- and Y represents phenylthio-.

Fractions 3 and 3a had the same retention time and were separated by their different solubilities in the eluent.

EXAMPLE 26

A black mixture dye was made by mixing together 48 parts of the yellow dye of Example 11, 33 parts of the red dye of Example 1 and 19 parts of the pleochroic blue dye, 1,8-dihydroxy-4,5-diamino-2,7-di-isobutylanthraquinone. A 3.65% solution of this dye in Liquid Crystal Host 10 (see Table 5 below) is especially suitable for use in a $10^{-5}$ m reflective, guest-host display with a single polariser.

EXAMPLE 27

A black mixture dye was made by mixing together 46 parts of the yellow dye of Example 11, 32.5 parts of the red dye of Example 1 and 21.5 parts of the pleochroic blue dye used in Examples 26. A 6.5% solution of this dye in the liquid crystal mixture E43 is suitable for use in a phase change guest host display without a polariser.

The compounds described in the Examples have the properties identified in Table 4 as solutions in the liquid crystal medium, E43, at 20° C., unless otherwise stated.

TABLE 4

| Example | Solubility (%) | λmax (nm) | Order Parameter |
|---|---|---|---|
| 1 | 14.7 | 550 | 0.80 |
| 1 | 2.5 (−2° C.) | | |
| 2 | 1.0 | 550 | 0.80 |
| 3 | 3.0 | 550 | 0.77 |
| 4 | 4.7 | 550 | 0.75 |
| 5 | | | |
| 6 | 3.2 | 464 | 0.80 |
| 7 | 3.3 | 464 | 0.78 |
| 8 | 2.4 | 464 | 0.78 |
| 9 | 2.5 | 464 | 0.80 |
| 10 | 2.9 | 464 | 0.78 |
| 11 | 8.6 | 464 | 0.79 |
| 11 | 4.4 (−2° C.) | | |
| 12 | 2.4 | 464 | 0.78 |
| 13 | 1.8 | 464 | 0.80 |
| 14 | 3.1 | 470 | 0.75 |
| 15 | 4.0 | 460 | 0.78 |
| 16 | 9.2 | 465 | 0.81 |
| 17 | | | |
| 18 | 0.8 | 605 | 0.73 |
| 19 | 1.0 | 648 | 0.72 |
| 20 | 7.8 | 615 | 0.71 |
| 21 | 2.0 | 520 | 0.77 |
| 22 | 14.3 | 520 | 0.81 |
| 23 | 4.6 | | 0.79 |
| 24 | 3.6 | | 0.83 |

The properties of some of the dyes described in the Examples were also measured in other liquid crystal media (hosts) at 20° C., unless otherwise stated, and the results are set out in Table 5.

TABLE 5

| Host | Dye of Example | Order Parameter | Solubility (%) |
|---|---|---|---|
| 1 | 11 | 0.73 | |
| 1 | 6 | 0.72 | |
| 1 | 1 | 0.73 | |
| 2 | 11 | 0.79 | 4.0 |
| 2 | 6 | 0.80 | 2.0 |
| 2 | 1 | 0.80 | 4.6 |
| 3 | 11 | 0.81 | 2.5 |
| 3 | 6 | 0.81 | 1.5 |
| 3 | 1 | 0.79 | ca 5.0 |
| 4 | 11 | 0.74 | |
| 4 | 1 | 0.75 | |
| 5 | 6 | 0.68 | 3.1 |
| 5 | 1 | 0.75 | 7.2 |
| 6 | 6 | 0.78 | 2.0 |
| 8 | 6 | 0.78 | |
| 9 | 11 | 0.81 | |
| 9 | 6 | 0.81 | |
| 9 | 1 | 0.80 | |
| 10 | 11 | 0.78 | 4.0 (−2° C.) |
| 10 | 1 | 0.78 | 1.1 (−2° C.) |
| 11 | 11 | 0.78 | >5.0 |
| 11 | 11 | | 4.4 (−2° C.) |
| 11 | 1 | 0.80 | >5.0 |
| 11 | 1 | | 2.2 (−2° C.) |
| 12 | 11 | 0.77 | 2.0 |
| 12 | 1 | 0.78 | 3.0 |

The liquid crystal materials referred to in Table 5 as Hosts 1 to 12 have the following compositions:

Host 1 is the liquid crystal material E7, available from BDH Chemicals Ltd, which includes the compounds:
1-cyano-4'-n-heptyl-biphenyl: 25%
1-cyano-4'-n-pentyl-biphenyl: 51%
1-cyano-4'-n-octyloxy-biphenyl: 16%
1-cyano-4''-n-pentyl-terphenyl: 8%

Host 2 is the liquid crystal material ZLI 1132, available from E Merck & Co, which includes the following compounds:
1-cyano-4-(n-propylcyclohexyl)benzene,
1-cyano-4-(n-pentylcyclohexyl)benzene,
1-cyano-4-(n-heptylcyclohexyl)benzene
and 4-cyano-4'-(n-pentylcyclohexyl)biphenyl Host 3 is the liquid crystal material ZLI 1695, available from E Merck & Co, Darmstadt, West Germany. This has a clearing point (nematic to isotropic transition temperature) of 72° C.

Host 4 is a mixture of alkyl-cyanophenyl-dioxanes containing n-propyl, n-pentyl and n-heptyl chains.

Host 5 is the liquid crystal material ZLI 1565, available from E Merck & Co. This has a clearing point of 85° C.

Host 6 is the liquid crystal material ZLI 1624, available from E Merck & Co. This has a clearing point of 87° C.

Host 8 is the liquid crystal material RO-TN 430 available from Hoffmann La Roche Co. This has a clearing point of 69° C.

Host 9 is a mixed bicyclo-octane liquid crystal material containing the following compounds:
1-cyano-4[n-propyl-bicyclo(2,2,2)octyl]benzene: 30%
1-cyano-4[n-pentyl-bicyclo(2,2,2)octyl]benzene: 40%
1-cyano-4[n-heptyl-bicyclo(2,2,2)octyl]benzene: 30%

Host 10 is a mixture of liquid crystal materials based mainly on cyanobiphenyls and available from BDH Chemicals Ltd under the name E61.

Host 11 is a mixture of liquid crystal materials based mainly on cyanobiphenyls and available from BDH Chemicals Ltd under the name E49.

Host 12 is a mixture of fluorobicyclo(2,2,2)octane esters having negative anisotropy and containing a mixture of two compounds of the following formula:
1-alkyl-3-fluoro-4-[4-alkyl-bicyclo(2,2,2)octylcarbonyloxy]benzene (1) wherein both alkyl groups are pentyl: 55%
(2) wherein one is pentyl and one propyl: 45%

The very high stability of the dyes of the present invention is illustrated in Table 6, which sets out the results of experiments to determine the effect of exposing solutions of the dyes in a liquid crystal medium (E43) to u.v. and visible radiation. Deterioration of the dye was detected by a decrease in the absorption of the solution at λ max. The times (in hours) quoted in the table are for a reduction of 10% from the initial value.

TABLE 6

| Radiation | Time (hours) for 10% Reduction in Absorption Dye of | |
|---|---|---|
| | Example 6 | Example 1 |
| "Black" light (U.V., 20° C.) | 10,000 | 20,000 |
| Xenon arc (40° C.) (U.V. + visible) | 5,000 | 5,000 |

I claim:

1. An anthraquinone dye free from water-solubilising and ionic substituents of the general formula:

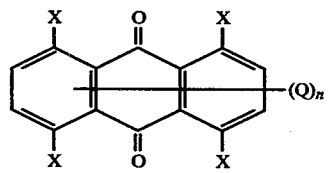

wherein
Q is $NH_2$, $C_1$ to $C_{20}$ alkyl, mono- or bi-carbocyclic aryl, $NO_2$ or halo;
n is 0 to 4;
each X independently is H, —SR, —$NZ_1Z_2$ or Q;
each R independently is $C_1$ to $C_{20}$ alkyl, mono- or bi-carbocyclic aryl or $C_4$ to $C_8$ cycloalkyl;
$Z_1$ & $Z_2$ are independently H, $C_1$ to $C_{20}$ alkyl, $C_4$ to $C_8$ cycloalkyl or mono- or bi-carbocyclic aryl;
provided that there are at least two different —SR groups and that where only two X's represent —SR groups at least one R is aryl and the two —SR groups are in the 1 & 5 or the 1 & 8 positions.

2. An anthraquinone dye according to claim 1 wherein n is 0 and 2, 3 or 4 of the groups represented by X are —SR, the remainder being H or —$NZ_1Z_2$.

3. An anthraquinone dye free from water-solubilising and ionic substituents of the formula:

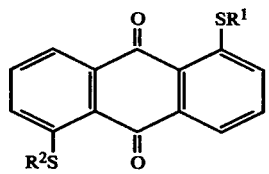

wherein $R^1$ is mono- or bi-carbocyclic aryl,
$R^2$ is $C_1$ to $C_{20}$ alkyl, $C_4$ to $C_8$ cycloalkyl or mono- or bi-carbocyclic aryl;
and $R^1$ and $R^2$ are different.

4. An anthraquinone dye according to claim 3 wherein $R^1$ and $R^2$ are both phenyl radicals which differ in the nature or the position of a substituent thereon.

5. The anthraquinone compound according to claim 3 wherein $R^1$ is phenyl and $R^2$ is 4-t-butylphenyl.

6. The anthraquinone compound according to claim 3 wherein $R^1$ is phenyl and $R^2$ is cyclohexyl.

7. An anthraquinone dye free from water-solubilising and ionic substituents of the formula:

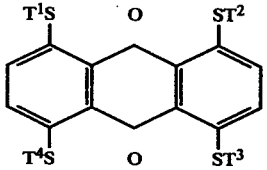

wherein $T^1$, $T^2$, $T^3$ and $T^4$ are each independently $C_1$ to $C_{20}$ alkyl, mono- or bi-carbocyclic aryl or $C_4$ to $C_8$ cycloalkyl and not more than three of $T^1$ to $T^4$ are identical.

8. An anthraquinone dye of the formula:

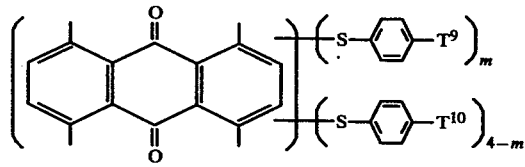

wherein $T^9$ is H, $T^{10}$ is t-butyl and m is from 1 to 3.

9. The anthraquinone compound according to claim 7 wherein $T^1$, $T^2$ and $T^3$ are 4-t-butylphenyl and $T^4$ is phenyl.

10. An anthraquinone dye according to claim 1 of the formula:

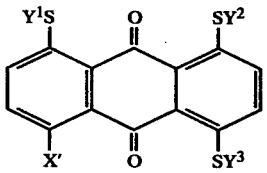

wherein $Y^1$, $Y^2$ and $Y^3$ are each independently $C_1$ to $C_{20}$ alkyl, mono- or bi-carbocyclic aryl or $C_4$ to $C_8$ cycloalkyl and $X^1$ is H or —$NZ_1Z_2$ provided not more than two of $Y_1$ to $Y_3$ are identical.

11. The anthraquinone dye according to claim 10 wherein $Y^1$ and $Y^3$ are 4-t-butylphenyl, $Y^2$ is phenyl and $X^1$ is H.

12. The anthraquinone dye according to claim 10 wherein $Y^1$ and $Y^3$ are 4-t-butylphenyl, $Y^2$ is phenyl and $X^1$ is anilino.

13. A composition comprising at least one unsymmetrical poly(substituted thio)anthraquinone dye according to claim 1, in which there are at least two different substituted thio groups, and at least one symmetrical poly-(substituted thio)anthraquinone dye, in which all the substituted thio groups are identical.

14. A composition according to claim 13 containing at least 50%, by weight, of the unsymmetrical poly(substituted thio)anthraquinone dye.

15. An anthraquinone dye or composition according to claim 1 or 13 wherein the product of the molar extinction of the dye or composition and the solubility of the dye (in moles/liter) is at least 500 $cm^{-1}$.

16. An anthraquinone compound according to any one of claims 1 to 3, 7 and 10 wherein at least one of the aryl groups represented by R, $R^1$, $R^2$, $t^1$ to $t^4$ and $Y^1$ to $Y^3$ carries a non-ionic substituent selected from $C_1$ to $C_{10}$ alkyl, $C_4$ to $C_8$ cycloalkyl and phenyl.

* * * * *